US011022313B2

(12) United States Patent
Boardman et al.

(10) Patent No.: US 11,022,313 B2
(45) Date of Patent: Jun. 1, 2021

(54) COMBUSTOR ASSEMBLY FOR A TURBINE ENGINE

(71) Applicant: General Electric Company, Schenectady, NY (US)

(72) Inventors: Gregory Allen Boardman, Liberty Township, OH (US); Pradeep Naik, Bangalore (IN); Allen Michael Danis, Mason, OH (US)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 15/189,061

(22) Filed: Jun. 22, 2016

(65) Prior Publication Data

US 2017/0370588 A1 Dec. 28, 2017

(51) Int. Cl.
*F23R 3/28* (2006.01)
*F02C 3/04* (2006.01)
(Continued)

(52) U.S. Cl.
CPC ............... *F23R 3/286* (2013.01); *F02C 3/04* (2013.01); *F02C 7/12* (2013.01); *F02C 7/222* (2013.01);
(Continued)

(58) Field of Classification Search
CPC ...... F23R 3/06; F23R 3/30; F23R 3/10; F23R 3/12; F23R 3/14; F23R 3/286; F23R 3/34; F23R 3/346; F23R 2900/03043; F23R 2900/03044; F23R 2900/03045; F02C 7/18; F05D 2260/201
See application file for complete search history.

(56) References Cited

U.S. PATENT DOCUMENTS

| 4,543,781 A | 10/1985 | Rice |
| 4,689,961 A | 9/1987 | Stratton |

(Continued)

FOREIGN PATENT DOCUMENTS

| EP | 0780638 | 6/1997 |
| EP | 1620679 A2 | 2/2006 |
| GB | 818634 | 9/1955 |

OTHER PUBLICATIONS

Rizk, N. and Mongia, H., 1991. Low NOx rich-lean combustion concept application. In 27th Joint Propulsion Conference (p. 1962).*

(Continued)

*Primary Examiner* — Arun Goyal
(74) *Attorney, Agent, or Firm* — General Electric Company; Pamela Kachur

(57) ABSTRACT

A rich-quench-lean combustor assembly for a gas turbine engine includes a liner extending between a forward end and an aft end. The liner includes a plurality of quench air jets positioned between the forward end and the aft end. The combustor assembly additionally includes a dome attached to or formed integrally with the liner, the dome and the liner together defining at least in part a combustion chamber. A fuel nozzle is attached to the dome, the fuel nozzle configured as a premix fuel nozzle for providing a substantially homogenous mixture of fuel and air to the combustion chamber, the mixture of fuel and air having an equivalence ratio of at least 1.5.

24 Claims, 9 Drawing Sheets

(51) Int. Cl.
*F02C 7/12* (2006.01)
*F02C 7/22* (2006.01)
*F23R 3/00* (2006.01)
*F23R 3/06* (2006.01)

(52) U.S. Cl.
CPC ............... *F23R 3/002* (2013.01); *F23R 3/06* (2013.01); *F23R 3/283* (2013.01); *F05D 2220/32* (2013.01); *F05D 2260/201* (2013.01); *F23R 2900/03043* (2013.01); *F23R 2900/03044* (2013.01); *Y02T 50/60* (2013.01)

(56) References Cited

U.S. PATENT DOCUMENTS

| | | | |
|---|---|---|---|
| 4,700,544 A * | 10/1987 | Fucci | F23R 3/045 60/757 |
| 4,787,208 A | 11/1988 | DeCorso | |
| 5,207,064 A | 5/1993 | Ciokajlo et al. | |
| 5,289,686 A | 3/1994 | Razdan et al. | |
| 5,511,375 A | 4/1996 | Joshi et al. | |
| 5,622,054 A | 4/1997 | Tingle | |
| 5,996,351 A | 12/1999 | Feitelberg et al. | |
| 6,098,397 A | 8/2000 | Glezer et al. | |
| 6,101,814 A | 8/2000 | Hoke et al. | |
| 6,240,731 B1 | 6/2001 | Hoke et al. | |
| 6,286,298 B1 * | 9/2001 | Burrus | F23R 3/50 60/732 |
| 6,314,716 B1 | 11/2001 | Abreu et al. | |
| 6,415,594 B1 | 7/2002 | Durbin et al. | |
| 6,460,339 B2 | 10/2002 | Nishida et al. | |
| 7,677,026 B2 | 3/2010 | Conete et al. | |
| 7,891,194 B2 * | 2/2011 | Biebel | F23R 3/06 60/752 |
| 7,895,841 B2 * | 3/2011 | Johnson | F23R 3/06 60/752 |
| 7,942,005 B2 | 5/2011 | Bessagnet et al. | |
| 7,954,325 B2 * | 6/2011 | Burd | F23R 3/04 60/752 |
| 7,984,615 B2 * | 7/2011 | Woodcock | F01D 9/026 60/754 |
| 8,141,365 B2 | 3/2012 | Bronson et al. | |
| 8,161,751 B2 | 4/2012 | Hall | |
| 8,171,740 B2 | 5/2012 | Bronson et al. | |
| 8,316,644 B2 | 11/2012 | Wilbraham | |
| 8,511,087 B2 | 8/2013 | Fox et al. | |
| 8,528,337 B2 * | 9/2013 | Berry | F23D 14/62 60/737 |
| 8,739,546 B2 * | 6/2014 | Snyder | F23R 3/06 60/752 |
| 8,910,481 B2 | 12/2014 | Kim et al. | |
| 8,938,971 B2 | 1/2015 | Poyyapakkam et al. | |
| 8,973,367 B2 | 3/2015 | Bottcher et al. | |
| 9,068,748 B2 | 6/2015 | Hoke | |
| 9,074,764 B2 | 7/2015 | Hull et al. | |
| 9,080,770 B2 * | 7/2015 | Dudebout | F23R 3/06 |
| 9,175,857 B2 | 11/2015 | Melton et al. | |
| 9,243,801 B2 * | 1/2016 | Cunha | F23R 3/002 |
| 9,297,534 B2 | 3/2016 | Citeno et al. | |
| 9,322,554 B2 * | 4/2016 | Kim | F23R 3/06 |
| 9,400,110 B2 * | 7/2016 | Dudebout | F23R 3/002 |
| 9,404,418 B2 | 8/2016 | ElKady et al. | |
| 9,551,492 B2 | 1/2017 | Haynes et al. | |
| 10,539,327 B2 | 1/2020 | Chang | |
| 2005/0247064 A1 | 11/2005 | Lieuwen | |
| 2005/0247065 A1 | 11/2005 | Dudebout et al. | |
| 2006/0130486 A1 * | 6/2006 | Danis | F23R 3/002 60/752 |
| 2007/0125093 A1 | 6/2007 | Burd et al. | |
| 2007/0193248 A1 | 8/2007 | Bessagnet et al. | |
| 2008/0041059 A1 | 2/2008 | Teets | |
| 2008/0127651 A1 * | 6/2008 | Zupanc | F23R 3/06 60/752 |
| 2008/0276619 A1 | 11/2008 | Chopra et al. | |
| 2009/0139239 A1 | 6/2009 | Zupanc et al. | |
| 2009/0142548 A1 * | 6/2009 | Patterson | C23C 4/02 428/137 |
| 2010/0126174 A1 | 5/2010 | Brinkmann et al. | |
| 2010/0257864 A1 | 10/2010 | Prociw et al. | |
| 2010/0287941 A1 * | 11/2010 | Kim | F23R 3/06 60/752 |
| 2011/0185736 A1 | 8/2011 | McKinney | |
| 2011/0203287 A1 | 8/2011 | Chila et al. | |
| 2012/0017596 A1 * | 1/2012 | Rudrapatna | F23R 3/06 60/752 |
| 2012/0131923 A1 | 5/2012 | ELKady et al. | |
| 2012/0186256 A1 * | 7/2012 | Dai | F23C 7/004 60/737 |
| 2012/0285173 A1 | 11/2012 | Poyyapakkam et al. | |
| 2012/0297778 A1 | 11/2012 | Rudrapatna et al. | |
| 2012/0304647 A1 | 12/2012 | Dudebout et al. | |
| 2013/0025289 A1 | 1/2013 | Citeno et al. | |
| 2013/0031905 A1 | 2/2013 | Slobodyanskiy et al. | |
| 2013/0327057 A1 * | 12/2013 | Cunha | F23R 3/002 60/782 |
| 2014/0060060 A1 | 3/2014 | Bernero et al. | |
| 2014/0238024 A1 * | 8/2014 | Kraemer | F23R 3/14 60/733 |
| 2014/0305095 A1 | 10/2014 | Inoue et al. | |
| 2015/0128607 A1 | 5/2015 | Lee | |
| 2016/0010856 A1 | 1/2016 | Biagioli et al. | |
| 2016/0305663 A1 * | 10/2016 | Lebel | F23R 3/06 |
| 2017/0370584 A1 | 12/2017 | Boardman wt al. | |
| 2017/0370588 A1 | 12/2017 | Boardman et al. | |

OTHER PUBLICATIONS

U.S. Appl. No. 15/189,074, filed Jun. 22, 2016.
U.S. Appl. No. 15/189,085, filed Jun. 22, 2016.
PCT Search Report and Written Opinion issued in connection with corresponding PCT Application No. PCT/US2017/033947 dated Mar. 8, 2018.
International Search Report issued in connection with related International Patent Application No. PCT/US2017/036667 dated Jun. 15, 2018.
Office Action issued in connection with related European Patent Application No. 17829060.7 dated Aug. 4, 2020.
International Search Report issued in connection with related International Patent Application No. PCT/US2017/033100 dated Mar. 9, 2018.

* cited by examiner

COMBUSTOR ASSEMBLY FOR A TURBINE ENGINE

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Traditionally, the combustion section includes a combustor for receiving compressed air and fuel and combusting the combination to provide the turbine section with the combustion gasses. The fuel and air is typically provided with an equivalence ratio of about 1:1 such that substantially stoichiometric combustion takes place. However, such may lead to relatively high peak temperatures, and further to undesirable amounts of NOx formation.

Accordingly, a combustion section for a gas turbine engine capable of avoiding these issues would be useful. More specifically, a combustion section capable of generating combustion gases having a reduced amount of NOx, while efficiently combusting all of the fuel would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a rich-quench-lean combustor assembly is provided for a gas turbine engine defining an axial direction. The combustor assembly includes a liner extending between a forward end and an aft end, the liner including a plurality of quench air jets positioned between the forward end and the aft end. The combustor assembly additionally includes a dome attached to or formed integrally with the liner, the dome and the liner together defining at least in part a combustion chamber. The combustor assembly additionally includes a fuel nozzle attached to the dome, the fuel nozzle configured as a premix fuel nozzle for providing a substantially homogenous mixture of fuel and air to the combustion chamber, the mixture of fuel and air having an equivalence ratio of at least 1.5.

In another exemplary embodiment of the present disclosure, a gas turbine engine is provided. The gas turbine engine defines an axial direction and includes a compressor section and a turbine section arranged in serial flow order. The gas turbine engine also includes a combustor assembly. The combustor assembly includes a liner extending between a forward end and an aft end, the liner including a plurality of quench air jets positioned between the forward end and the aft end. The combustor assembly additionally includes a dome attached to or formed integrally with the liner, the dome and the liner together defining at least in part a combustion chamber. The combustor assembly additionally includes a fuel nozzle attached to the dome, the fuel nozzle configured as a premix fuel nozzle for providing a substantially homogenous mixture of fuel and air to the combustion chamber, the mixture of fuel and air having an equivalence ratio of at least 1.5.

In an exemplary aspect of the present disclosure, a method is provided for operating a combustor assembly of a gas turbine engine. The combustor assembly includes a liner attached to or formed integrally with a dome, the liner including a plurality of quench air jets and the dome including a fuel nozzle attached thereto. The method includes providing a substantially homogenous mixture of fuel and air having an equivalence ratio of at least about 1.5 through the fuel nozzle to a combustion chamber defined at least in part by the dome and the liner. The method also includes providing the combustion chamber with a quench airflow through the plurality of quench air jets of the liner at a location downstream from the fuel nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
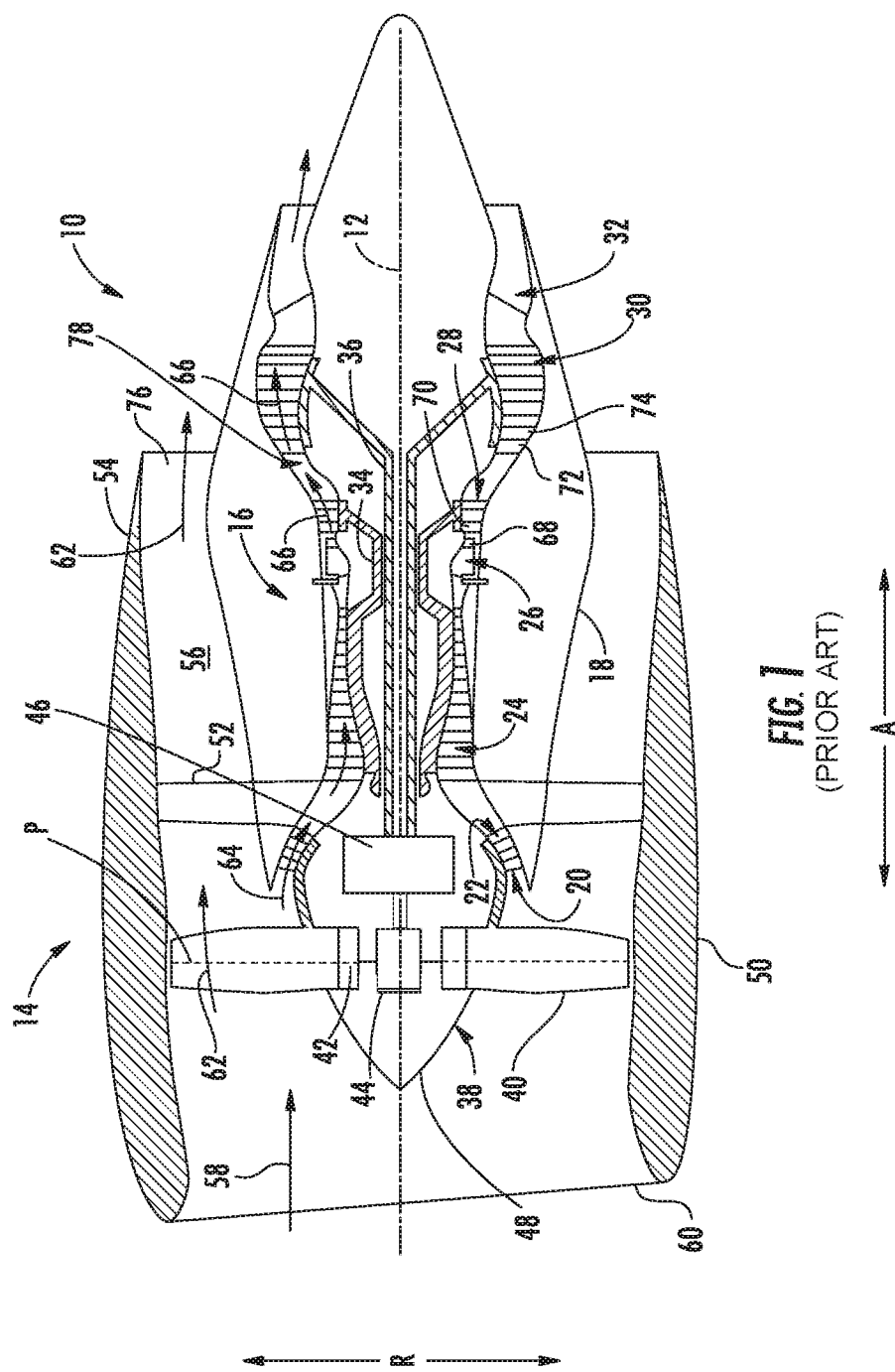
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal axis 12 provided for reference), a radial direction R, and a circumferential direction C (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. For the embodiment depicted, the nacelle 50 is supported relative to the core turbine engine 16 by a plurality of circumferentially-spaced outlet guide vanes 52, and a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. Additionally, it will be appreciated that in other embodiments, aspects of the present disclosure may be incorporated into any other suitable gas turbine engine, such as a suitable aeronautical gas turbine engine (e.g., turboshaft, turboprop, turbojet, etc.), land-based gas turbine engine (e.g., power generation gas turbine engine), aero-derivative gas turbine engine (e.g., marine applications), etc.

Figure 2:
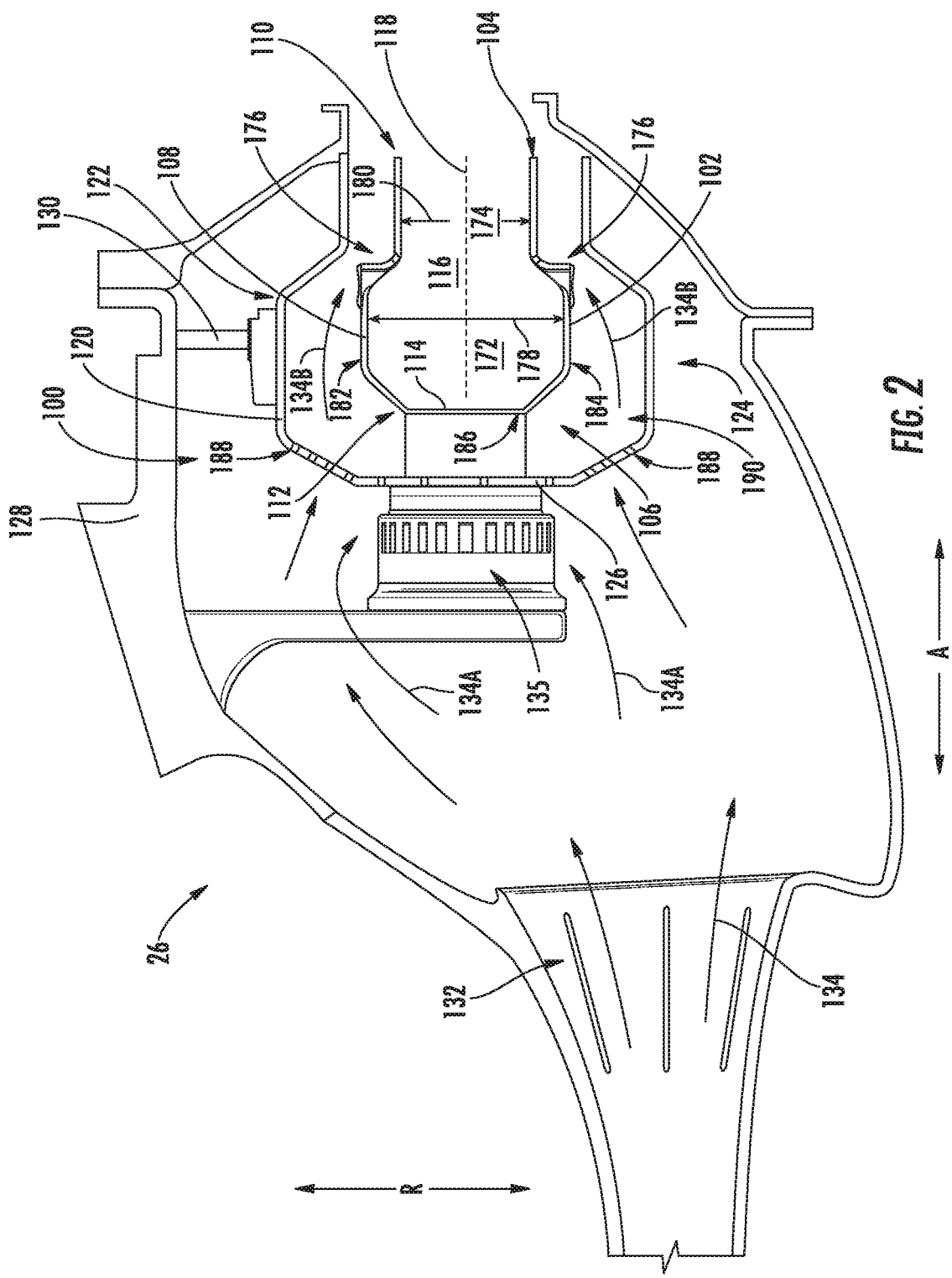
FIG. 2 is a close-up, cross-sectional view of a combustor assembly in accordance with an exemplary embodiment of the present disclosure.

Referring now to FIG. 2, a close-up cross-sectional view is provided of a rich-quench-lean ("RQL") combustor assembly ("combustor assembly 100") in accordance with an exemplary embodiment of the present disclosure. In certain embodiments, for example, the combustor assembly 100 of FIG. 2 may be positioned in the combustion section 26 of the exemplary turbofan engine 10 of FIG. 1. Alternatively, however, it may be positioned in any other suitable gas turbine engine. For example, in other embodiments, the combustor assembly 100 may be incorporated into one or more of a turboshaft engine, a turboprop engine, a turbojet engine, a land-based gas turbine engine for power generation, an aero-derivative or marine gas turbine engine, etc.

As shown, the combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 are each attached to or formed integrally with a dome 114. More particularly, for the embodiment depicted, the inner and outer liners 102, 108 are each formed integrally with the dome 114, such that the inner liner 102, outer liner 108, and dome 114 form a one-piece combustor liner extending continuously from the aft 104 end of the inner liner 102, to the forward end 106 of the inner liner 102, across the dome 114, to the forward end 110 of the outer liner 108, and to the aft end 112 of the outer liner 108. Although not depicted in FIG. 2, the one-piece combustor liner may additionally extend along the circumferential direction C. In certain embodiments, the one-piece combustor liner may extend continuously along the circumferential direction C, or alternatively, the combustor assembly 100 may include a plurality of one-piece combustor liners arranged along the circumferential direction C. Furthermore, as will be discussed in greater detail below, the inner and outer liners 102, 108 and dome 114 together at least partially define a combustion chamber 116, the combustion chamber 116 having a centerline 118 extending therethrough.

For the embodiment depicted, the inner liner 102, the outer liner 108, and dome 114 are each formed of a ceramic matrix composite (CMC) material, which is a non-metallic material having high temperature capability. Exemplary CMC materials utilized for such liners 102, 108 and the dome 114 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). It should be appreciated, however, that in other embodiments, one or more of the inner liner 102, outer liner 108, and dome 114 may be formed of any other suitable material, such as a traditional metal alloy.

Referring still to FIG. 2, the combustor assembly 100 further includes a flow sleeve 120 enclosing the inner liner 102, outer liner 108, and dome 114. The flow sleeve 120 generally includes an outer portion 122, an inner portion 124, and a forward portion 126. For the embodiment depicted, the combustor assembly 100 is mounted within an outer casing of the gas turbine engine, and more particularly, the flow sleeve 120 is mounted to an outer combustor casing 128 of the gas turbine engine using one or more mounting features 130. The one or more mounting features 130, for the embodiment depicted, are attached to the outer portion 122 of the flow sleeve 120. Additionally, although not depicted, the combustor assembly 100 may include a plurality of such mounting features 130 attached to the outer portion 122 of the flow sleeve 120 and spaced along the circumferential direction C.

For the exemplary flow sleeve 120 depicted, the outer portion 122, forward portion 126, and inner portion 124 are formed integrally as a one-piece flow sleeve, extending continuously. Additionally, although not depicted, the flow sleeve 120 may additionally extend continuously along the circumferential direction C. However, in other embodiments, one or more of the outer portion 122, forward portion 126, and inner portion 124 may be formed separately and attached in any suitable manner. Additionally, in other embodiments, the flow sleeve 120 may be formed of a plurality of individual flow sleeves 120 spaced along the circumferential direction C.

As is also depicted in FIG. 2, the combustor assembly 100 is positioned downstream of a diffuser 132 of the gas turbine engine. The diffuser 132 is positioned at an aft end of a combustion section of the gas turbine engine for providing compressed air 134 from the combustion section to the combustor assembly 100. The combustor assembly 100 further includes a fuel nozzle 135 for receiving a portion of the compressed air 134, mixing the received portion of the compressed air 134 with fuel, and providing such fuel-air mixture to the combustion chamber 116. As will be shown and discussed in greater detail below, the fuel nozzle 135 depicted is configured as a pre-mix fuel nozzle and the combustor assembly 100 further includes a plurality of fuel nozzles 135 spaced substantially evenly along the circumferential direction C (see, e.g., FIGS. 5, 8). Additionally, it should be appreciated that in certain embodiments, the fuel may be a natural gas (such as methane), LNG, propane, lean methane, high H2 content fuel, a petroleum distillate (such as No. 2 distillate fuel), kerosene, heavy fuel oil, marine diesel fuel, or any other suitable fuel.

Figure 3:
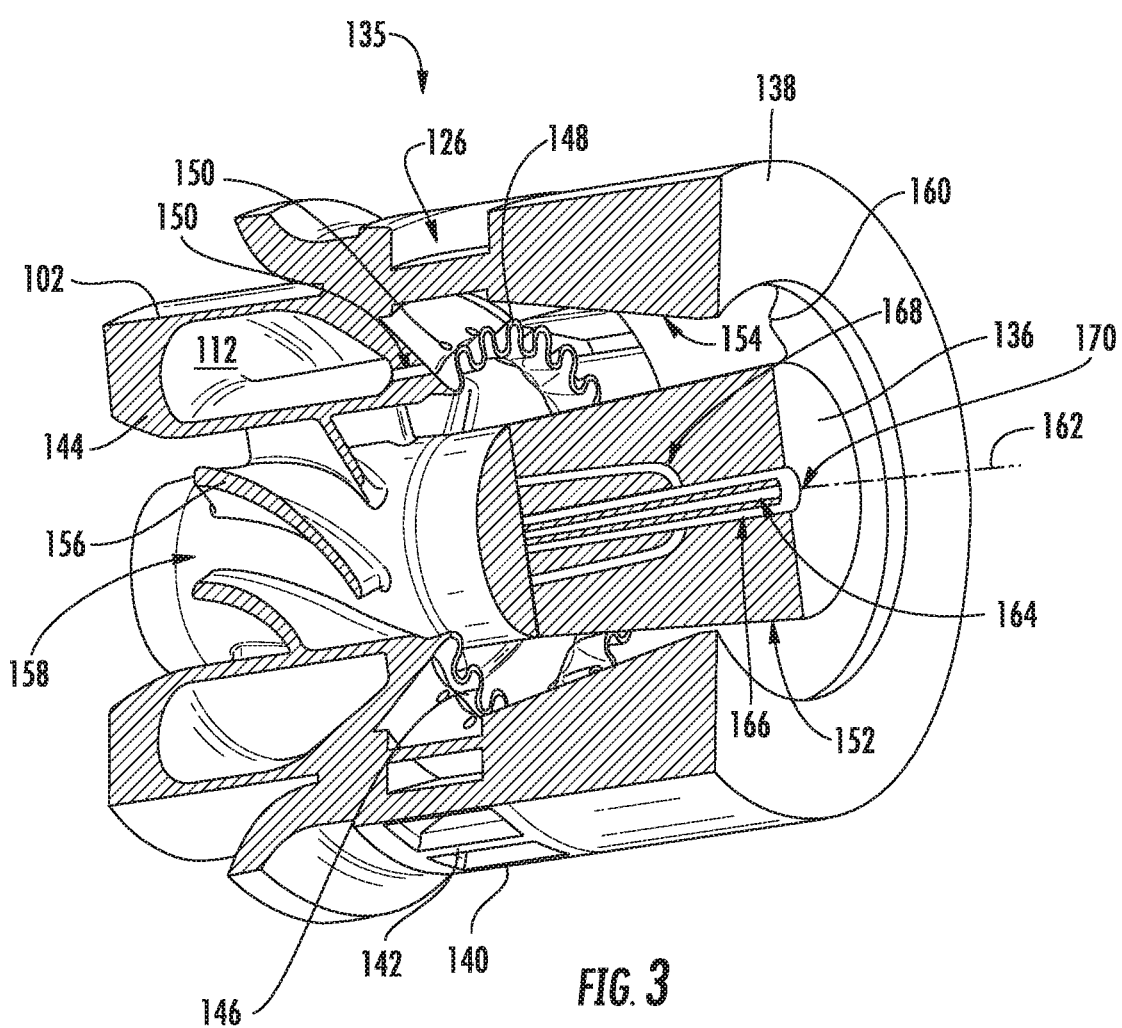
FIG. 3 is a close-up, cutaway view of a fuel nozzle in accordance with an exemplary embodiment of the present disclosure.

Referring now briefly to FIG. 3, a close-up, perspective, cross-sectional view is provided of a pre-mix fuel nozzle 135 in accordance with one or more embodiments of the present disclosure as may be incorporated in the exemplary combustor assembly 100 of FIG. 2.

The fuel nozzle 135 of FIG. 3 generally includes a centerbody 136 and an outer sleeve 138 that generally surrounds the centerbody 136. The outer sleeve 138 includes one or more radial vanes 140 forming a radial swirler 142. An inner sleeve 144 is disposed between the centerbody 136 and the outer sleeve 138. The inner sleeve 144, at least a part of which is generally disposed upstream of the radial swirler 142, includes a contoured shroud 146 at an aft end. Generally, the contoured shroud 146 is aerodynamically contoured to promote mixing of a liquid or gaseous fuel and air. For example, the contoured shroud 146 includes a plurality of lobes 148.

Moreover, the radial swirler 142 is disposed radially outward of the contoured shroud 146 and a fuel injection port 150. The fuel injection port 150 is defined between the inner sleeve 144 and a portion of the outer sleeve 138, and provides for a flow of fuel from a fuel circuit (not depicted) defined by the fuel nozzle 135. As shown, at least one fuel injection port 150 is disposed upstream, or forward, of the contoured shroud 146.

The positioning of the radial swirler 142 to the contoured shroud 146 and fuel injection port 150 is such that compressed air, such as a portion of the compressed air 134 from the diffuser 132 (see FIG. 2), entering through the radial swirler 142 converges and mixes with a liquid or gaseous fuel exiting a fuel injection port 150. The contoured shroud 146 may aid in positioning the fuel exiting the fuel injection port 150 such that the convergence of air 126 through the radial swirler 142 may deliver high levels of fuel-air mixing.

Generally upstream in the fuel nozzle 135 from the contoured shroud 146, an outer surface 152 of the centerbody 136 and an inner surface 154 of the inner sleeve 144 includes a plurality axially oriented vanes 156 forming an axial swirler 158. The axial swirler 158 may have any geometry between at least one outer surface 152 of the centerbody 136 and at least one inner surface 154 of the inner sleeve 144, and is not limited to any particular geometry, unless otherwise specified. Neither the centerbody 136 nor the inner sleeve 144 is bound to one diametric value for its entire structure. Furthermore, the centerbody 136 and subsequent surrounding features may have other radial cross-sectional forms, such as an elliptical or polygonal radial cross section.

Notably, a relationship of the outer sleeve 138 to the centerbody 136 creates an annular circuit 160 substantially along a length of the centerbody 136. In the embodiment shown in FIG. 3, the radial cross-sectional area of the annular circuit 160 at a first location is greater than at a second location downstream of the first location. Thus, the annular circuit 160 may converge as it extends downstream along a center axis 162. More specifically, the inner surface 132 of the outer sleeve 138 is converging toward the center axis 162 as the inner surface 132 extends downstream, while the outer surface 152 of the centerbody 136 is diverging from the center axis 162. In other embodiments, however, the inner surface 132 of the outer sleeve 138 may have any other suitable shape relative to the outer surface 152 of the centerbody 136.

Referring still to the exemplary fuel nozzle 135 of FIG. 3, the centerbody 136 includes a first centerbody circuit 164, a second centerbody circuit 166, and a third centerbody circuit 168 leading to at least one circuit outlet 170 to egress a fluid (e.g. liquid or gaseous fuel, air, inert gas, or combination thereof). The second centerbody circuit 166 and the third centerbody circuit 168 are positioned generally co-axial to the first centerbody circuit 164. In another embodiment, the second centerbody circuit 166 or the third centerbody circuit 168 may be tunnels within the centerbody (i.e., not annular cavities), radially outward from a first centerbody circuit 164. Any combination of centerbody circuits 164, 166, 168 may be fluidly connected toward the downstream end of the centerbody 136 before egressing through the centerbody outlet 170. In another embodiment, any centerbody circuit 164, 166, 168, or a combination thereof, may egress independently to a circuit outlet 170 without fluid interconnection. The exemplary fuel nozzle 135 may be configured for independent variable flow rates within each centerbody circuit 164, 166, 168. It should be apparent to one skilled in the art that additional centerbody circuits (fourth, fifth . . . Nth) may be installed and arranged in substantially similar manner as the first, second, and third circuits 164, 166, 168 described herein.

The exemplary fuel nozzle 135 depicted in FIG. 3, and described herein, may allow for the fuel nozzle 135 to provide a substantially homogenous mixture of fuel and air to the combustion chamber 116 during operation of the combustor assembly 100. As used herein, "substantially homogenous" means more mixed than not, i.e., having a mixedness greater than fifty percent (50%). For example, in certain embodiments, the fuel nozzle 135 may be configured to provide a mixture of fuel and air to the combustion chamber 116 having at least about a seventy percent (70%) mixedness. More specifically, in certain embodiments, the fuel nozzle 135 may be configured to provide a mixture of fuel and air to the combustion chamber 116 having at least about an eighty percent (80%) mixedness. It should be appreciated, that as used herein, terms of approximation, such as "about" or "approximately," refer to being within a ten percent (10%) margin of error.

Moreover, as used herein, the term "mixedness" with respect to a mixture of fuel and air, refers to a calculation for determining how a fuel species varies over a surface. Mixedness may be calculated generally using the following formula:

$$\text{Mixedness} = 1 - \frac{\sigma_f}{\bar{f}},$$

where $\sigma_f$ is a standard deviation of mixture fraction and $\bar{f}$ is a mass weighted average of mixture fraction. Each may be calculated in the manner described below.

The mixture fraction, $f$, is defined in terms of the atomic mass fraction, which may be expressed as follows:

$$f = \frac{x_i - x_{i,ox}}{x_{i,fuel} - x_{i,ox}},$$

where $x_i$ is the elemental mass fraction for the element, $x_{i,ox}$ denotes the oxidizer, and $x_{i,fuel}$ denotes the value at the fuel stream.

Further, the standard deviation, $\sigma_f$, of the mixture fraction on a surface is computed using the following formula:

$$\sigma f = \sqrt{\frac{\sum_{i=1}^{n}(f - f_0)^2}{n}}.$$

Further, still, the mass weighted average of the mixture fraction, $\bar{f}$, is calculated by dividing the summation of the value mixture fraction multiplied by the absolute value of the dot product of the facet area and momentum vectors by the summation of the absolute value of the dot product of the facet area and momentum vectors, as is indicated in the following formula:

$$\bar{f} = \frac{\sum_{i=1}^{n} f_i \rho_i |\vec{V_i} - \vec{A_i}|}{\sum_{i=1}^{n} \rho_i |\vec{V_i} - \vec{A_i}|}.$$

Mixedness calculated in accordance with the above method may provide a mixedness at an outlet of a fuel nozzle.

Further, it should be appreciated, that in other exemplary embodiments, the combustor assembly 100 may have any other suitable fuel nozzle, and that the present application is not limited to the exemplary fuel nozzle 135 depicted in FIG. 3 and described above, unless specifically so limited by the claims.

Referring now back to FIG. 2, as stated, the combustor assembly 100 is configured as an RQL combustor assembly 100 (i.e., a combustor assembly providing for a rich combustion, a quench air, and subsequently a lean combustion). In order to achieve an initial rich combustion, the fuel nozzle 135 is further configured to provide a mixture of fuel and air to the combustion chamber 116 having an equivalence ratio of at least 1.5. More specifically, for the embodiment depicted the fuel nozzle 135 is configured to provide the combustion chamber 116 with a mixture of fuel and air having an equivalence ratio at least about two (2). Notably, as used herein, "equivalence ratio" refers to a ratio of fuel to air.

As depicted, the combustion chamber 116 includes a primary combustion zone 172 and a secondary combustion zone 174. The substantially homogenous mixture of fuel and air, having an equivalence ratio of at least 1.5, is combusted in the primary combustion zone 172. However, given the relatively high equivalence ratio of such a mixture of fuel and air, incomplete combustion occurs (i.e., less than stoichiometric combustion). In order to complete the combustion process, the combustor assembly 100 is configured to introduce an additional amount of air downstream of the primary combustion zone 172 forming the secondary combustion zone 174. More specifically, the inner liner 102 of the combustor assembly 100 includes a plurality of quench air jets 176 positioned between the forward end 106 and the aft end 104, and similarly the outer liner 108 of the combustor assembly 100 includes a plurality of quench air jets 176 positioned between the forward 112 end and the aft end 110.

As will be appreciated, a majority of the compressed air 134 from the diffuser 132 is received by the combustor assembly 100 for combustion (i.e., "compressed air for combustion 134A"), while in at least certain embodiments, a portion of the compressed air 134 from the diffuser 132 is diverted downstream for cooling operations (not shown). In order to achieve a desired equivalence ratio, along with the desired mixedness of the fuel and air mixture provided to the combustion chamber 116, a majority of the compressed air for combustion 134A is introduced into the combustion chamber 116 through the plurality of quench air jets 176 of the inner liner 102 and outer liner 108. More specifically, in at least certain embodiments, at least about sixty percent (60%) of the compressed air for combustion 134A is introduced to the combustion chamber 116 through the quench air jets 176 of the inner liner 102 and the outer liner 108 is a quench airflow 134B. For example, in certain embodiments, at least about seventy percent (70%) of the compressed air for combustion 134A is introduced to the combustion chamber 116 through the quench air jets 176 of the inner liner 102 and the outer liner 108 as quench airflow 134B.

The quench airflow 134B introduced through the quench air jets 176 of the inner liner 102 and outer liner 108 may mix with the combustion gases from the primary combustion zone 172 in the secondary combustion zone 174. The mixture of quench airflow 134B through the quench air jets 176 and combustion gases from the primary combustion zone 172 may result in a lean combustion mixture within the secondary combustion zone 174. For example, such a mixture of fuel and air may have an equivalence ratio of less than about 0.75. More specifically, in certain embodiments at least, the secondary combustion zone 174 may define an equivalence ratio of less than about 0.65.

For the embodiment depicted in FIG. 2, the quench air jets 176 of the inner liner 102 and the outer liner 108 are each positioned approximately halfway along a length of the inner liner 102 and the outer liner 108, respectively (i.e., about halfway between the respective forward ends 106, 112 and aft ends 104, 110). Notably, the exemplary combustion chamber 116 depicted converges aft of the primary combustion zone 172, and the quench air jets 176 of the inner liner 102 and the outer liner 108 are positioned at the convergence. More specifically, the exemplary combustor assembly 100 depicted defines a forward height 178 within the combustion chamber 116 between the outer liner 108 and the inner liner 102 at a location forward of the plurality of quench air jets 176 of the outer liner 108 and the inner liner 102. Additionally, the combustor assembly 100 defines an aft height 180 within the combustion chamber 116 between the outer liner 108 and the inner liner 102 at a location aft of the plurality of quench air jets 176 of the outer liner 108 and the inner liner 102. A ratio of the forward height 178 to the aft height 180 is at least about 1.75:1. For example, in certain embodiments, the ratio of the forward height 178 to the aft height 180 may be at least about 2:1.

As used herein, the forward height 178 is defined in a direction that extends perpendicular to the centerline 118 of the combustion chamber 116 and intersects with a longitudinal axis of the gas turbine engine (e.g., axis 12 of FIG. 1). Similarly, the aft height 180 is defined in a direction that extends perpendicular to the centerline 118 of the combustion chamber 116 and intersects with the longitudinal axis of the gas turbine engine. Further, each of the forward height 178 and aft height 180 refer to the greatest heights in the respective directions, and more particularly, for the embodiment depicted, refer to heights immediately forward and immediately aft, respectively, of the quench air jets 176 of the inner liner 102 and outer liner 108.

Briefly, it should also be appreciated, that for the embodiment depicted, the plurality of quench air jets 176 of the inner liner 102 and of the outer liner 108 are each positioned at approximate the same position along the centerline 118 of the combustion chamber 116, i.e., such that they are aligned. However, in other embodiments, the quench air jets 176 of the inner liner 102 may be offset from the quench air jets 176 of the outer liner 108 along the centerline 118. For example, in certain embodiments, the quench air jets 176 of the inner liner 102 may be positioned forward of the quench air jets 176 of the outer liner 108, or alternatively, the quench air jets 176 of the inner liner 102 may be positioned aft of the quench air jets 176 of the outer liner 108.

Figure 4:
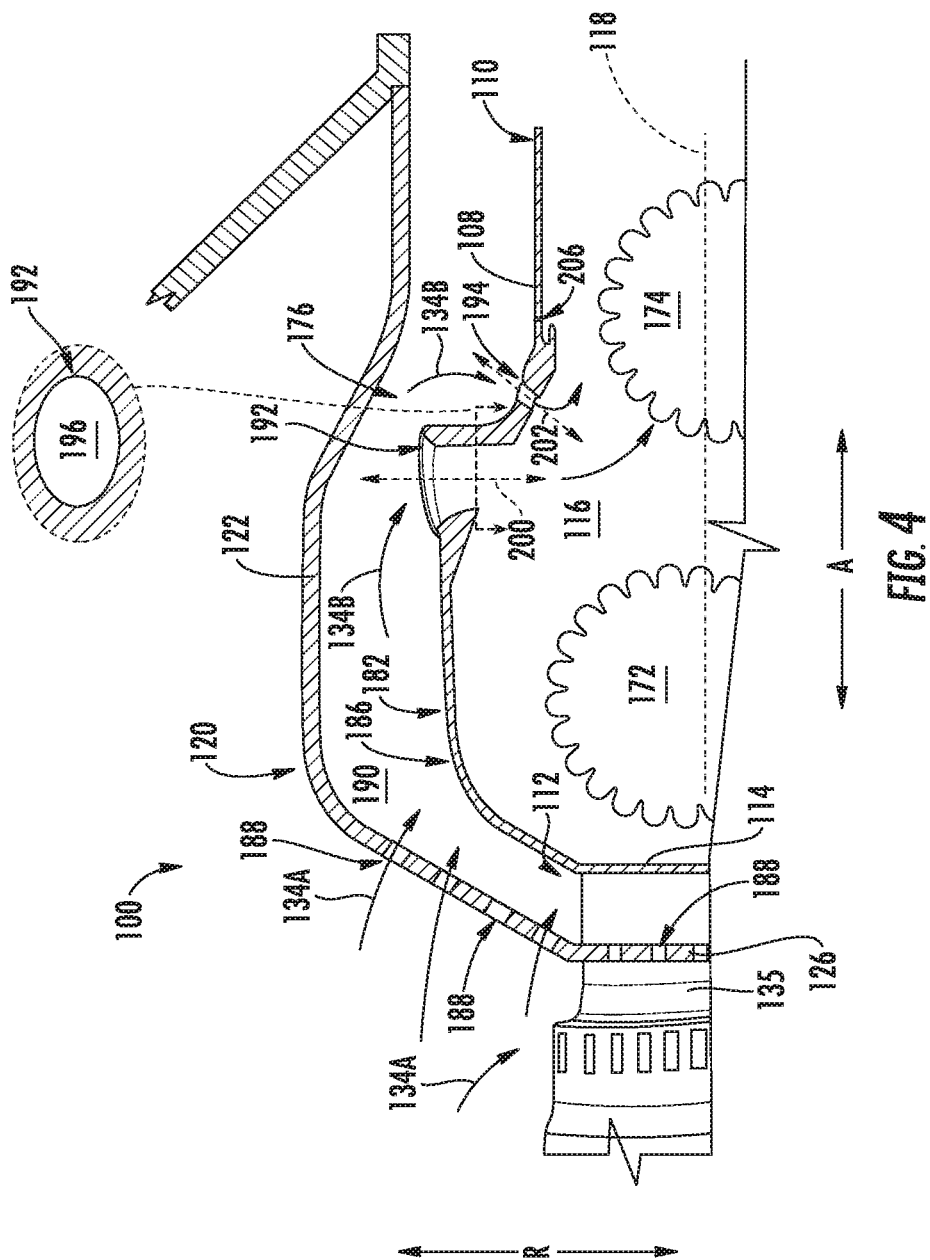
FIG. 4 is a close-up, cross-sectional view of a portion of the exemplary combustor assembly of FIG. 2.
Figure 5:
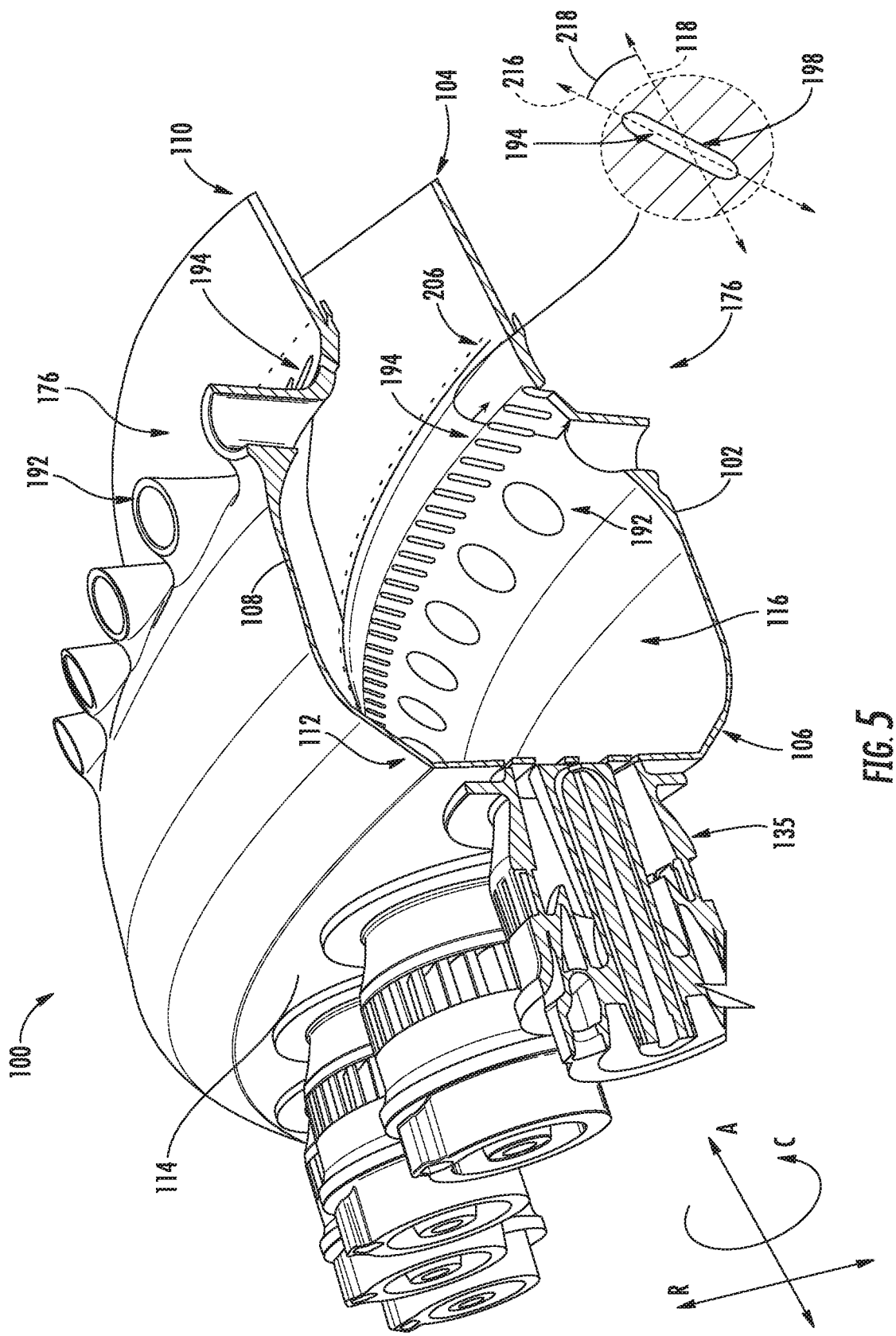
FIG. 5 is a perspective view of a section of the exemplary combustor assembly of FIG. 2, with a flow sleeve removed for clarity.

Reference will now be made also to FIGS. 4 and 5. FIG. 4 provides a close-up, cross-sectional view of a section of the exemplary combustor assembly 100 of FIG. 2, and FIG. 5 provides a perspective view of a section of the exemplary combustor assembly 100 of FIG. 2, with the flow sleeve 120 removed for clarity.

As previously discussed, the mixture of fuel and air provided to the primary combustion zone 172 of the combustion chamber 116 by the fuel nozzles 135 defines a relatively high equivalence ratio. In order to maintain the desired equivalence ratio, the combustor assembly 100 is configured such that substantially no cooling air enters the combustion chamber 116 forward of the quench air jets 176 of the inner liner 102 and the outer liner 108. More particularly, for the embodiment depicted, the inner liner 102 defines a forward section 182 extending between the quench air jets 176 and the dome 114 and the outer liner 108 similarly defines a forward section 184 extending between the quench air jets 176 and the dome 114. For the embodiment depicted, the forward section 182 of the inner liner 102, the forward section 184 of the outer liner 108, and the dome 114 are each configured to prevent a flow of cooling air from entering the combustion chamber 116, and are further configured to be cooled substantially by one or both of impingement cooling or convective cooling. More particularly, for the embodiment depicted, each of the forward section 182 of the inner liner 102, the forward section 184 of the outer liner 108, and the dome 114 are free from any cooling holes and are configured to be cooled through a flow of impingement air onto an outer surface 186 of the respective components.

Further, for the embodiment depicted, the impingement air for cooling the forward section 184 of the outer liner 108, the forward section 182 of the inner liner 102, and the dome 114 is provided through impingement cooling holes 188 defined by the flow sleeve 120. The impingement cooling holes 188 through the flow sleeve 120 are all positioned forward of the quench air jets 176 of the inner and outer liners 102, 108. During operation, a portion of the compressed air for combustion 134A not provided to the combustion chamber 116 through the fuel nozzles 135 flows through the impingement cooling holes 188 defined by the flow sleeve 120, through a chamber 190 (defined between the flow sleeve 120 and the outer liner 108, dome 114, and inner liner 102) directly onto the outer surfaces 186 of the forward section 194 of the outer liner 108, the forward section 182 of the inner liner 102, and the dome 114 for cooling such components. Notably, while such a cooling method may not provide a level of cooling attainable through inclusion of cooling holes through the inner and outer liners 102, 108 and/or dome 114, as discussed above, the inner and outer liners 102, 108 and dome 114 may be formed of a CMC material. Additionally, as the combustor assembly 100 is configured for incomplete combustion in the primary combustion zone, a temperature within the combustion chamber 116 proximate the forward sections 182, 184 of the inner and outer liners 102, 108 may be reduced. Accordingly, with such an embodiment the components may be capable of withstanding the temperatures necessary for operation without inclusion of cooling holes.

Moreover, referring still to FIGS. 4 and 5, for the embodiment depicted, the quench air jets 176 of the outer liner 108 and the quench air jets 176 of the inner liner 102 are each configured in a two-stage configuration. More particularly, referring first to the quench air jets 176 of the outer liner 108, the quench air jets 176 include a plurality of primary stage air jets 192 and a plurality of secondary stage air jets 194. The plurality of primary stage air jets 192 are each spaced from the plurality of secondary stage air jets 194 along the axial direction A and along the centerline 118.

Further, for the embodiment depicted the plurality of primary stage air jets 192 are each configured as relatively large air jets, while the plurality of secondary stage air jets 194 are each configured as relatively small air jets. For example, each of the plurality of primary stage air jets 192 define a cross-sectional area 196 (see cross-section close up in FIG. 4) and each of the plurality of secondary stage air jets 194 also defines a cross-sectional area 198 (see cross-section close up in FIG. 5). For the embodiment depicted, the cross-sectional area 196 of the primary stage air jets 192 is greater than the cross-sectional area 198 of the secondary stage jets. For example, in at least certain embodiments, a ratio of the cross-sectional area 196 of the primary stage air jets 192 to the cross-sectional area 198 of the secondary stage air jets 194 may be at least about 1.75:1, such as at least about 2:1, or at least about 2.25:1. It should be appreciated, that for embodiments where a cross-section of the primary stage air jets 192 and/or secondary stage air jets 194 vary, e.g., along the circumferential direction C (see, e.g., FIG. 9), the cross-sectional area 196 and cross-sectional area 198 refer to an average cross-sectional area.

In addition to differing in size, the exemplary combustor assembly 100 depicted includes a greater number of secondary stage air jets 194 as compared to the primary stage air jets 192. More particularly, for the embodiment depicted, the combustor assembly 100 defines a ratio of a number of secondary stage air jets 194 to a number of primary stage air jets 192 of at least about 1.5:1. For example, in certain embodiments, the combustor assembly 100 may define a ratio of a number of secondary stage air jets 194 to a number of primary stage air jets 192 of at least about 1.75:1, of at least about 2:1, or of at least about 2.25:1.

Further, at least for the embodiment depicted, the number of primary stage air jets 192 correlates to a number of fuel nozzles 135. For example, in the embodiment depicted, the combustor assembly 100 defines a ratio of a number of primary stage air jets 192 to a number of fuel nozzles 135 of at least about 1.5:1. More particularly, in certain embodiments, the combustor assembly 100 may define a ratio of a number of primary stage air jets 192 to a number of fuel nozzles 135 of at least about 1.75:1, of at least about 2:1, or of at least about 2.25:1.

Further still, as briefly mentioned above, the quench air jets 176 of the inner liner 102 and the outer liner 108 are positioned at the convergence of the combustion chamber 116, about halfway along a length of the inner liner 102 and outer liner 108. For the embodiment depicted, the plurality of primary stage air jets 192 are positioned at a forward end of the convergence, and the plurality of secondary stage air jets 194 are positioned at an aft end of the convergence. Additionally, the primary stage air jets 192 and secondary stage air jets 194 may be separated a distance (i.e., a distance from an edge of one opening to an edge of the other opening along the centerline 118) of less than about ten percent (10%) of a total length of the inner liner 102 or outer liner 108 along the centerline 118. Moreover, as may be seen most clearly in FIG. 4, the plurality of primary stage air jets 192 are oriented substantially perpendicularly to the centerline 118 of the combustion chamber 116 (i.e., a length-wise centerline 200 of each primary air jet 194 is substantially perpendicular to a local centerline 118 of the combustion chamber 116). By contrast, the plurality of secondary stage air jets 194 are, for the embodiment, oriented oblique relative to the centerline 118 of the combustion chamber 116 (i.e., a length-wise centerline 202 of each of the plurality of secondary stage air jets 194 define an angle relative to a local centerline 118 of the combustion chamber 116). For example, the centerline 118 of each of the plurality of secondary stage air jets 194 may define an angle relative to a local centerline 118 of the combustion chamber 116 less than about seventy-five (75) degrees, such as less than about sixty (60) degrees. It should be appreciated, however, that in other exemplary embodiments, the plurality of primary air jets may instead be oriented oblique to the centerline 118 of the combustion chamber 116, and further, in certain embodiments, the plurality of secondary stage air jets 194 may be oriented perpendicularly to the centerline 118 of the combustion chamber 116.

Notably, aft of the quench air jets 176, the exemplary inner liner 102 and outer liner 108 depicted each include a plurality of film cooling holes 206. The film cooling holes 206 provide for cooling of an inside surface (i.e., a surface adjacent to the combustion chamber 116) of the inner liner 102 and outer liner 108. It should be appreciated, that the film cooling holes 206 may be at least about ⅒ of a size of the secondary stage air jets 194.

Figure 6:
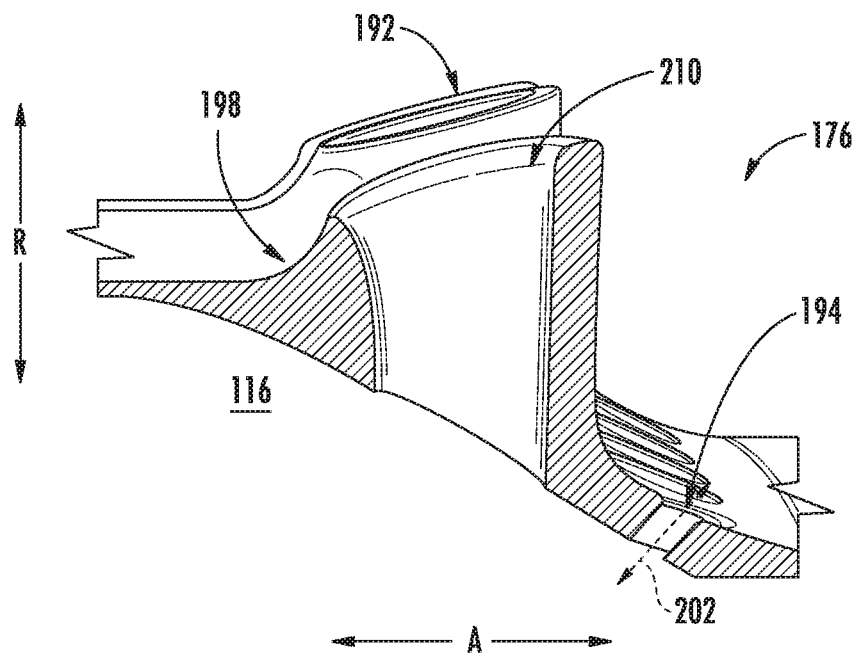
FIG. 6 is a close-up, side, cross-sectional view of a primary stage air jet of the exemplary combustor assembly of FIG. 2 in accordance with an exemplary aspect of the present disclosure.

Referring now briefly to FIG. 6, providing a close-up, cross-sectional view of the exemplary primary stage air jet 192 depicted in FIG. 4, the outer liner 108 includes an inlet transition 208 immediately forward of each of the plurality of primary stage air jets 192. The inlet transition 208 may reduce an amount of separation of the compressed air for combustion 134A from the outer liner 108 as the compressed air for combustion 134A flows over the outer liner 108 and into the primary stage air jets 192. For the embodiment depicted, the inlet transition 208 defines a radius of curvature at least about 0.65 inches. For example, in certain embodiments, the inlet transition 208 may define a radius of curvature of at least about 0.75 inches. As used herein, the term "radius of curvature" refers to a radius of a circle that touches a curve at a given point and has the same tangent and curvature at that point.

Figure 7:
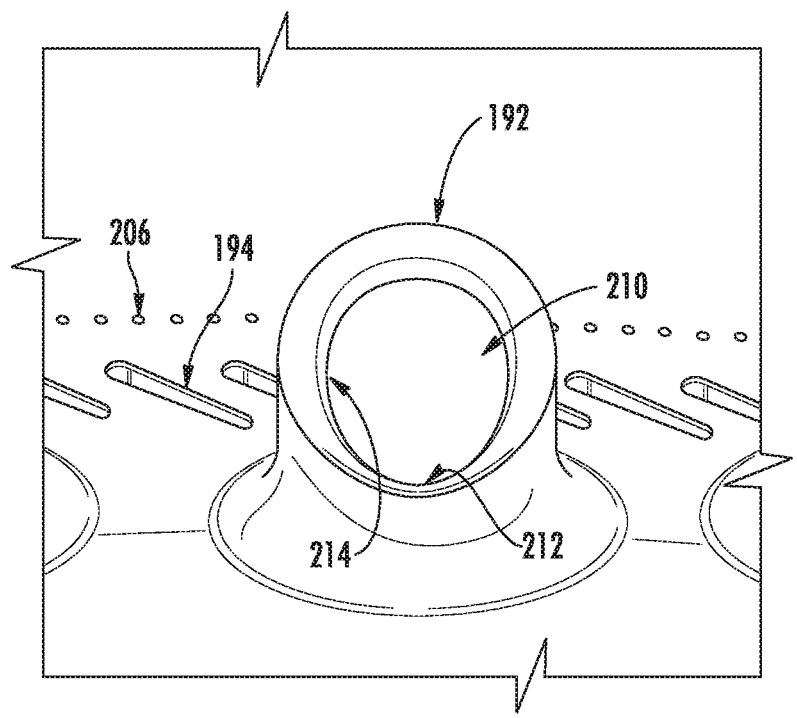
FIG. 7 is a close-up, outside view of the exemplary primary stage air jet of FIG. 6.

Further, referring now briefly to FIG. 7, providing an outer view of the primary stage air jet 192 of the outer liner 108 depicted in FIG. 4, the exemplary primary stage air jet 192 defines an inlet 210 having a generally elliptical shape. For the embodiment depicted, the elliptical shape of the inlet includes a minor radius of curvature 212 of at least about 0.25 inches and a major radius of curvature 214 of at least about 0.4 inches. However, in other embodiments, the elliptical shape of the inlet 210 may instead define any other suitable major and/or minor radius of curvature 212, 214. For example, in other embodiments, the elliptical shape of the inlet 210 may define a minor radius of curvature 212 of at least about 0.3 inches and a major radius of curvature 214 of at least about 0.5 inches. Additionally, it should be appreciated that in other embodiments, the inlet of the primary stage air jets 192 may have any other suitable shape, and similarly, a cross-section of the primary stage air jets 192 may have any other suitable shape. For example, although for the embodiment depicted, the cross-sections of the primary stage air jets 182 are substantially elliptical, in other embodiments they may be substantially circular, squared, triangular, polygonal, etc.

By contrast, referring now back to FIG. 5, for the embodiment depicted, each of the plurality of secondary stage air jets 194 are configured as elongated slots, elongated along a widthwise direction 216. Furthermore, for the embodiment depicted, the elongated slots define an oblique angle 218 relative to the axial direction A and relative to the centerline 118 of the combustion chamber 116 (see particularly, the close up of elongated slot in FIG. 5). For example, the elongated slots (i.e., the widthwise direction 216) may define an angle 218 of at least about thirty degrees (30°) relative to the axial direction A and centerline 118, such as at least about forty-five degrees (45°) relative to the axial direction A and centerline 118. However, in other embodiments, the widthwise direction 216 of the elongated slots may define any other suitable angle 218 with the axial direction A and centerline 118. Additionally, in still other embodiments, it should be appreciated, that the secondary stage air jets 194 may instead be circular in shape, elliptical in shape, or have any other suitable shape.

As stated, in certain embodiments, at least about sixty percent (60%) of the compressed air for combustion 134A is introduced to the combustion chamber 116 through the quench air jets 176 as a quench airflow 134B. Inclusion of the plurality of primary stage air jets 192 and the plurality secondary stage air jets 194 in accordance with the present disclosure may allow for substantially even distribution of the quench airflow 134B between the plurality of primary stage air jets 192 and the plurality of secondary stage air jets 194. For example, in certain embodiments, the combustor assembly 100 may be configured to provide between about forty percent (40%) and about sixty percent (60%) of the quench airflow 134B through the plurality of primary stage air jets 192 and between about forty percent (40%) and about sixty percent (60%) of the quench airflow 134B through the plurality of secondary stage air jets 194. More specifically, in certain embodiments, the combustor assembly 100 may be configured to provide about fifty-five percent (55%) of the quench airflow 134B through the plurality of primary stage air jets 192 and about forty-five percent (45%) of the quench airflow 134B through the plurality of secondary stage air jets 194.

The plurality of quench air jets 176 configured in such a manner may allow for the quench airflow 134B to reach the combustion gasses from the primary combustion zone 172 across an entire height of the secondary combustion zone 174. More particularly, with such a configuration, the primary stage air jets 192 may be configured to provide deep penetration of the quench airflow 134B, while the secondary stage air jets 194 may be configured to provide relatively shallow penetration of the quench airflow 134B.

It should be appreciated, that although the description above with reference to FIGS. 4 through 6 is directed to the outer liner 108 and the quench air jets 176 of the outer liner 108, in certain embodiments, the quench air jets 176 of the inner liner 102 may be configured in substantially the same manner.

Figure 8:
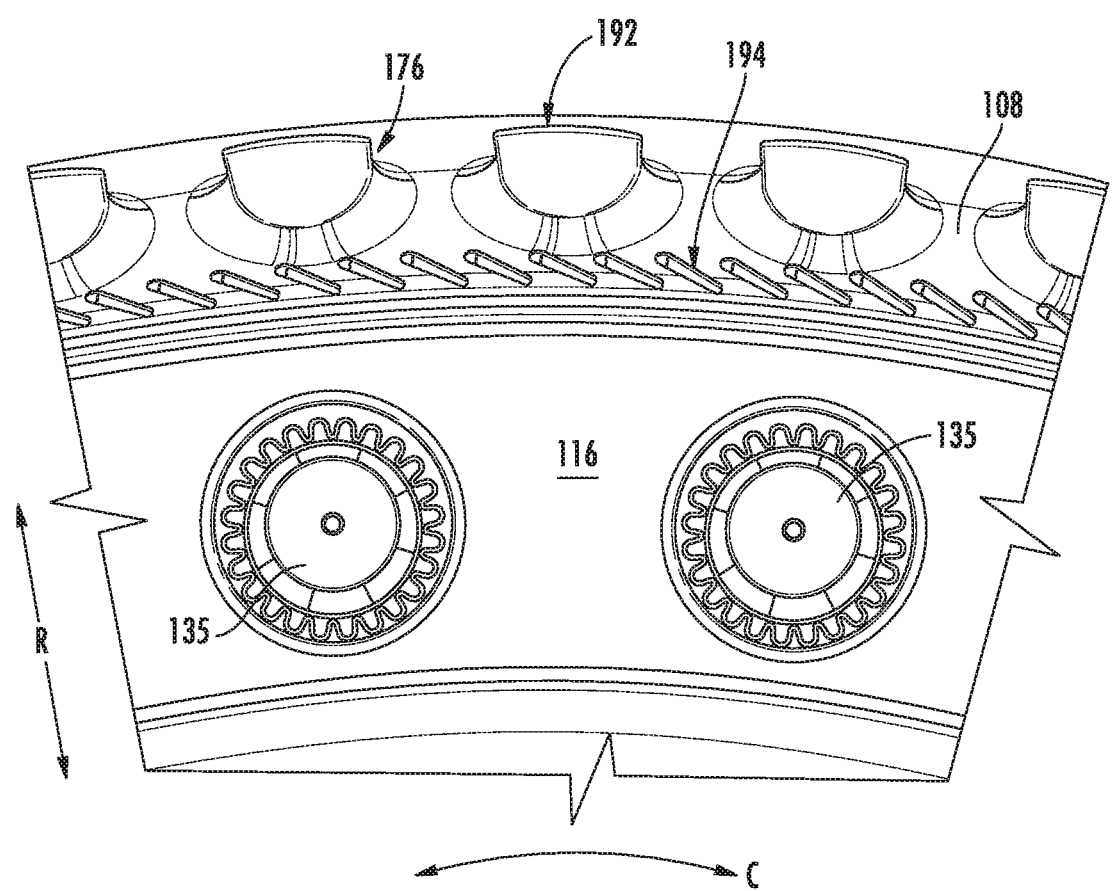
FIG. 8 is a forward-looking-aft view of a combustion chamber, dome, and outer liner of the exemplary combustor assembly of FIG. 2, in accordance with an exemplary aspect of the present disclosure.

Reference will now be made to FIG. 8. FIG. 8 provides a view along a centerline 118 of the combustion chamber 116 depicted in FIG. 4, looking forward from an aft end. More particularly, FIG. 8 provides a view of the outer liner 108, along with the primary stage air jets 192 and secondary stage air jets 194, the combustion chamber 116, and an aft end of two of the plurality of fuel nozzles 135. As is depicted, and as may be seen in other of the Figures, the plurality of primary stage air jets 192 are each spaced along the circumferential direction C, and similarly, the plurality of secondary stage air jets 194 are also spaced along the circumferential direction C. Particularly for the embodiment depicted, each of the plurality of primary stage air jets 192 and the plurality of secondary stage air jets 194 are substantially evenly spaced along the circumferential direction C. As may also be seen in FIG. 8, each of the plurality of primary stage air jets 192 are substantially the same size (i.e., each defines substantially the same cross-sectional area) and further, each of the plurality of secondary stage air jets 194 are also substantially the same size (i.e., each defines substantially the same cross-sectional area).

It should be appreciated, however, that in other exemplary embodiments of the present disclosure, one or both of the plurality of primary stage air jets 192 or the plurality of secondary stage air jets 194 may define a variable spacing along the circumferential direction C and/or a variable size. For example, referring now to FIG. 9, a view is provided along a centerline 118 of a combustion chamber 116 of a combustor assembly 100, looking forward from an aft end, in accordance with another exemplary embodiment of the present disclosure is provided.

Figure 9:
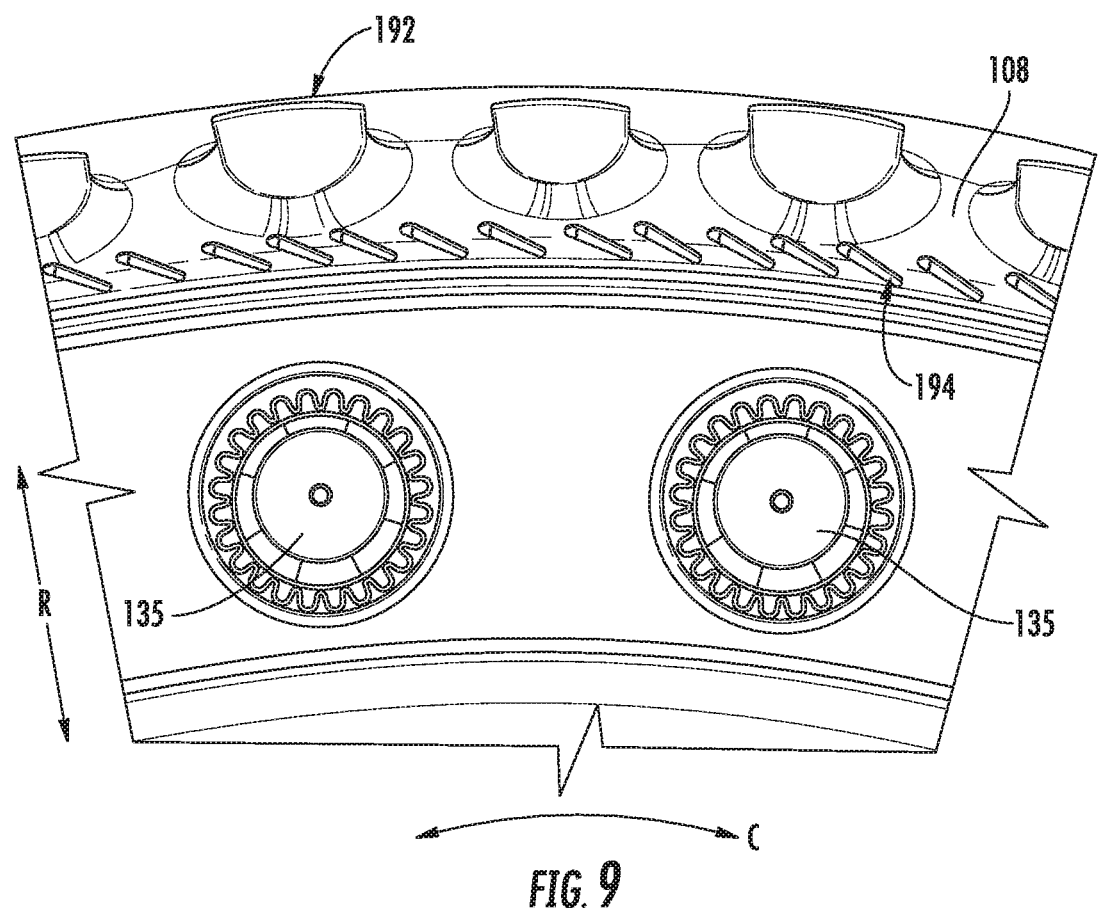
FIG. 9 is a forward-looking-aft view of a combustion chamber, dome, and outer liner of a combustor assembly in accordance with another exemplary embodiment of the present disclosure.

For the embodiment of FIG. 9, at least one of the plurality of primary stage air jets 192 or plurality of secondary stage air jets 194 are unevenly spaced along the circumferential direction C. More particularly, for the embodiment of FIG. 9, the plurality of secondary stage air jets 194 are unevenly spaced along the circumferential direction C. For the embodiment depicted, the uneven spacing along the circumferential direction C of the plurality of secondary stage air jets 194 correlates to a position of the plurality of fuel nozzles 135. Specifically, for the embodiment depicted, the plurality of secondary stage air jets 194 are unevenly spaced along the circumferential direction C such that they are more closely spaced immediately downstream of the respective fuel nozzles 135.

Moreover, for the embodiment depicted, at least one of the plurality primary stage air jets 192 or plurality of secondary stage air jets 194 include a variable size along the circumferential direction C, which for the embodiment depicted also correlates to a position of the plurality of fuel nozzles 135. Specifically, for the embodiment depicted, the plurality primary stage air jets 192 include a variable sizing along the circumferential direction C, such that the primary stage air jets 192 located immediately downstream of a respective fuel nozzle 135 are larger (i.e. define a larger cross-sectional area) as compared to other primary stage air jets 192 not located immediately downstream of a respective fuel nozzle 135.

It should be appreciated, however, that in other exemplary embodiments, the combustor assembly 100 may have any other suitable configuration, and that the above description is not meant to be limiting unless the claims specifically provide for such limitations.

A combustor assembly 100 in accordance with one or more embodiments of the present disclosure may allow for a more efficient combustor assembly 100, with reduced emissions. More particularly, a combustor assembly 100 in accordance with one or more embodiments of the present disclosure may allow for reduced NOx emissions. For example, by including a primary combustion zone 172 with a relatively high equivalence ratio, and immediately downstream including a secondary combustion zone 174 with a relatively low equivalence ratio (facilitated by the two-stage quench air jets 176, lack of forward cooling holes, and/or pre-mixing nozzles), the relatively high combustion temperatures which may generate a maximum amount of NOx may be minimized.

Figure 10:
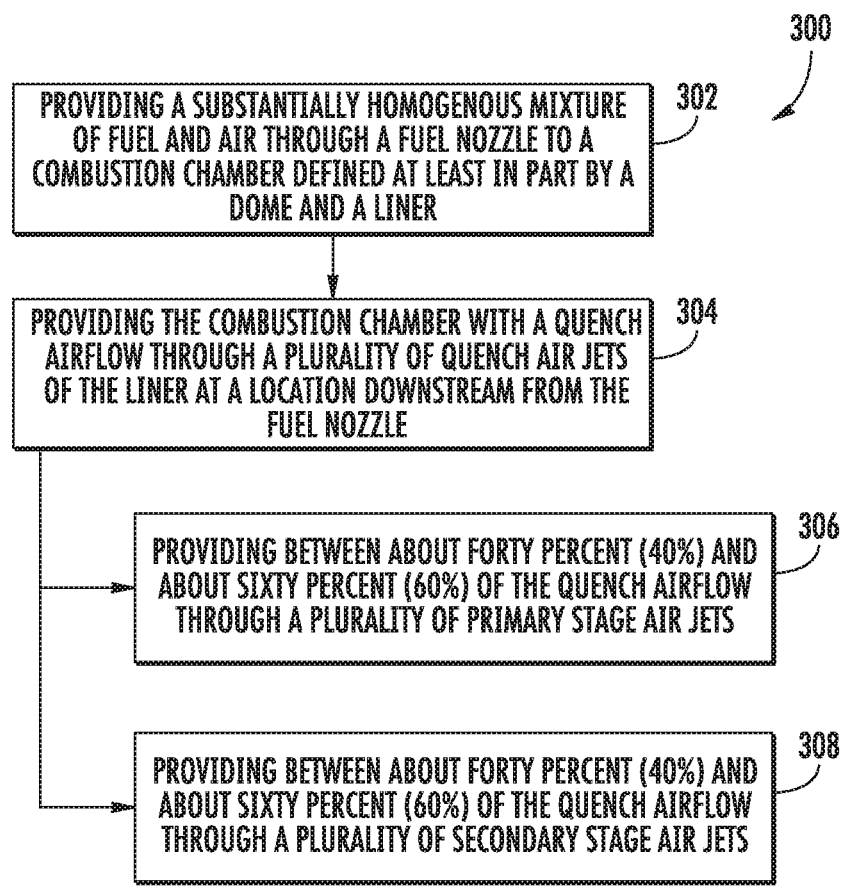
FIG. 10 is a flow diagram of a method for operating a combustor assembly in accordance with an exemplary aspect of the present disclosure.

Further, inclusion of the two-stage quench air jets 176 may allow for a plurality primary stage air jets 192 to achieve relatively deep penetration of a quench airflow into the combustion chamber 116, while the plurality of secondary stage air jets 194 may provide for relatively shallow penetration of a quench airflow into the combustion chamber 116, such that a more uniform provision of quench airflow to the secondary combustion zone 174 may be provided Referring now to FIG. 10, a flow diagram is provided of an exemplary method (300) for operating a combustor assembly of a gas turbine engine. In certain exemplary aspects, the method (300) may operate one or more of the exemplary combustor assemblies described above with reference to FIGS. 2 through 8. Accordingly, the exemplary combustor assembly may include a liner attached to or formed integrally with a dome, with the liner including a plurality of quench air jets and the dome including a fuel nozzle attached thereto.

The exemplary method (300) includes at (302) providing a substantially homogenous mixture of fuel and air having an equivalence ratio of at least about 1.5 through the fuel nozzle to a combustion chamber defined at least in part by the dome and the liner. Providing the substantially homogenous mixture of fuel and air at (302) may include providing a mixture of fuel and air to the combustion chamber having a mixedness of at least about seventy percent (70%), such as at least about eighty percent (80%).

Additionally, the exemplary method (300) includes at (304) providing the combustion chamber with a quench airflow through the plurality of quench air jets of the liner at a location downstream from the fuel nozzle. For the exemplary aspect depicted, the exemplary method is operable with a combustor assembly wherein the liner is an outer liner and wherein the combustor assembly further includes an inner liner. The outer liner and inner liner each include a plurality of quench air jets positioned between a respective forward end and aft end of the liners, with each set of quench air jets including a plurality of primary stage air jets spaced from a plurality of secondary stage air jets along an axial direction and along a centerline of the combustion chamber. Accordingly, for the exemplary aspect depicted, providing the combustion chamber with a quench airflow at (304) includes at (306) providing between about forty percent (40%) and about sixty percent (60%) of the quench airflow through the plurality of primary stage air jets and at (308) providing between about forty percent (40%) and about sixty percent (60%) of the quench airflow through the plurality of secondary stage air jets.

A combustor assembly operated in accordance with exemplary method described herein may allow for more efficient operation of the combustor assembly with reduced emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rich-quench-lean combustor assembly for a gas turbine engine defining an axial direction, the combustor assembly comprising:
spaced-apart inner and outer liners each extending between a forward end and an aft end, each of the liners comprising an annular forward section disposed adjacent the forward end, an annular aft section disposed adjacent the aft end and extending parallel to the annular forward section, and an annular convergence section interconnecting the annular forward section and the annular aft section, the annular convergence section disposed at an oblique angle to the annular forward section and the annular aft section, each of the liners comprising a plurality of quench air jets positioned between the forward end and the aft end;
a dome attached to or formed integrally with the liners, the dome and the liners together defining a combustion chamber, wherein the combustion chamber includes an upstream primary combustion zone, a downstream secondary combustion zone, and a convergence interconnecting the primary combustion zone and the secondary combustion zone; and
a fuel nozzle attached to the dome, the fuel nozzle configured as a premix fuel nozzle for providing a substantially homogenous mixture of fuel and air to the combustion chamber, the mixture of fuel and air having an equivalence ratio of at least 1.5,
wherein the plurality of quench air jets comprise a plurality of primary stage air jets and a plurality of secondary stage air jets, wherein the plurality of primary stage air jets are positioned at a forward end of the convergence section of the respective liner, and are oriented substantially perpendicularly to the axial direction, and the plurality of secondary stage air jets are positioned at an aft end of the convergence section of the respective liner, and are oriented oblique relative to the axial direction, wherein at least one of the plurality of primary stage air jets defines a first cross-sectional area, and at least one of the plurality of secondary stage air jets defines a second cross-sectional area less than the first cross-sectional area.

2. The combustor assembly of claim 1, wherein the combustor assembly is configured to receive compressed air for combustion, wherein at least about sixty percent (60%) of the compressed air for combustion is introduced into to the combustion chamber through the quench air jets of the inner liner and the outer liner.

3. The combustor assembly of claim 1, wherein the fuel nozzle is configured to provide a mixture of fuel and air to the combustion chamber having at least about a seventy percent (70%) mixedness.

4. The combustor assembly of claim 1, wherein the fuel nozzle is configured to provide a mixture of fuel and air to the combustion chamber having at least about an eighty percent (80%) mixedness.

5. The combustor assembly of claim 1, wherein the fuel nozzle is configured to provide the combustion chamber with a mixture of fuel and air having an equivalence ratio of at least about two (2).

6. The combustor assembly of claim 1, wherein the fuel nozzle comprises:
a centerbody;
an outer sleeve surrounding the centerbody, wherein a section of the outer sleeve comprises at least one radially oriented vane;
an inner sleeve disposed between the centerbody and at least a section of the outer sleeve, wherein a portion of the inner sleeve comprises a contoured shroud and wherein the inner sleeve and a portion of the outer sleeve defines at least one fuel injection port disposed upstream of the contoured shroud; and
at least one axially oriented vane defined between the centerbody and a section of the inner sleeve, wherein the axially oriented vane is disposed upstream of the fuel injection port.

7. The combustor assembly of claim 6, wherein the contoured shroud defines a plurality of lobes.

8. The combustor assembly of claim 7, wherein the fuel injection port is aligned between circumferentially adjacent lobes.

9. The combustor assembly of claim 1, wherein each of the liners comprises a forward section extending from the quench air jets to the dome, and wherein the forward section is configured to be cooled substantially by one or both of impingement cooling or convective cooling.

10. The combustor assembly of claim 9, wherein the forward section of the liner and the dome are each configured to prevent cooling air from entering the combustion chamber.

11. The combustor assembly of claim 1, wherein the dome is configured to be cooled substantially by one or both of impingement cooling or convective cooling.

12. The combustor assembly of claim 1, wherein at least one of the plurality of primary stage air jets defines an inlet having a generally elliptical shape, and at least one of the plurality of secondary stage air jets is an elongated slot, wherein the elongated slot elongates along a widthwise direction, and the widthwise direction defines an oblique angle relative to the axial direction of the rich-quench-lean combustor assembly.

13. The combustor assembly of claim 1, wherein a number of the secondary stage air jets is greater than a number of the primary stage air jets.

14. The combustor assembly of claim 1, wherein the rich-quench-lean combustor assembly defines a ratio of a number of the primary stage air jets to a number of the fuel nozzles of at least about 1.5:1.

15. The combustor assembly of claim 1, wherein the liner further comprises a plurality of film cooling holes positioned between the plurality of quench air jets and the aft end, configured to cool an inside surface of the liner.

16. The combustor assembly of claim 1, further comprising a flow sleeve enclosing the liner and the dome, wherein the flow sleeve comprises a plurality of impingement cooling holes.

17. A gas turbine engine defining an axial direction comprising:
a compressor section and a turbine section arranged in serial flow order; and
a rich-quench-lean combustor assembly positioned between the compressor section and the turbine section, the combustor assembly comprising:
spaced-apart inner and outer liners each extending between a forward end and an aft end, each of the liners comprising an annular forward section disposed adjacent the forward end, an annular aft section disposed adjacent the aft end and extending parallel to the annular forward section, and an annular convergence section interconnecting the annular forward section and the annular aft section, the annular convergence section disposed at an oblique angle to the annular forward section and the annular aft section, each of the liners comprising a plurality of quench air jets positioned between the forward end and the aft end;
a dome attached to or formed integrally with the liners, the dome and the liners together defining at least in part a combustion chamber, wherein the combustion chamber includes an upstream primary combustion zone, a downstream secondary combustion zone, and a convergence interconnecting the primary combustion zone and the secondary combustion zone; and
a fuel nozzle attached to the dome, the fuel nozzle configured as a premix fuel nozzle for providing a substantially homogenous mixture of fuel and air to the combustion chamber, the mixture of fuel and air having an equivalence ratio of at least 1.5,
wherein the plurality of quench air jets comprise a plurality of primary stage air jets and a plurality of secondary stage air jets, wherein the plurality of primary stage air jets are positioned at a forward end of the convergence section of the respective liner, and are oriented substantially perpendicularly to the axial direction, and the plurality of secondary stage air jets are positioned at an aft end of the convergence section of the respective liner, and are oriented oblique relative to the axial direction, wherein at least one of the plurality of primary stage air jets defines a first cross-sectional area, and at least one of the plurality of secondary stage air jets defines a second cross-sectional area less than the first cross-sectional area.

18. The gas turbine engine of claim 17, wherein the fuel nozzle is configured to provide a mixture of fuel and air to the combustion chamber having at least about a seventy percent (70%) mixedness.

19. The gas turbine engine of claim 17, wherein the fuel nozzle is configured to provide a mixture of fuel and air to the combustion chamber having at least about an eighty percent (80%) mixedness.

20. The gas turbine engine of claim 17, wherein the fuel nozzle is configured to provide the combustion chamber with a mixture of fuel and air having an equivalence ratio of at least about two (2).

21. A method for operating a combustor assembly of a gas turbine engine, the combustor assembly comprising spaced-apart inner and outer liners each attached to or formed integrally with a dome, each of the liners extending between forward and aft ends and comprising an annular forward section disposed adjacent the forward end, an annular aft section disposed adjacent the aft end and extending parallel to the annular forward section, and an annular convergence section interconnecting the annular forward section and the annular aft section, the annular convergence section disposed at an oblique angle to the annular forward section and the annular aft section, each of the liners comprising a plurality of quench air jets and the dome comprising a fuel nozzle attached thereto, the method comprising:

providing a substantially homogenous mixture of fuel and air having an equivalence ratio of at least about 1.5 through the fuel nozzle to a combustion chamber defined at least in part by the dome and the liner, wherein the combustion chamber includes an upstream primary combustion zone, a downstream secondary combustion zone, and a convergence interconnecting the primary combustion zone and the secondary combustion zone; and providing the combustion chamber with a quench airflow through the plurality of quench air jets of the liner at a location downstream from the fuel nozzle, wherein the plurality of quench air jets comprise a plurality of primary stage air jets and a plurality of secondary stage air jets, wherein the plurality of primary stage air jets are positioned at a forward end of the convergence section of the respective liner, and are oriented substantially perpendicularly to the axial direction, and the plurality of secondary stage air jets are positioned at an aft end of the convergence section of the respective liner, and are oriented oblique relative to the axial direction, wherein at least one of the plurality of primary stage air jets defines a first cross-sectional area, and at least one of the plurality of secondary stage air jets defines a second cross-sectional area less than the first cross-sectional area.

22. The method of claim 21, wherein the substantially homogenous mixture of fuel and air has an equivalence ratio of at least about 2.

23. The method of claim 21, wherein providing the substantially homogenous mixture of fuel and air through the fuel nozzle to the combustion chamber comprises providing a mixture of fuel and air to the combustion chamber having at least about a seventy percent (70%) mixedness.

24. The method of claim 21, wherein providing the substantially homogenous mixture of fuel and air through the fuel nozzle to the combustion chamber comprises providing a mixture of fuel and air to the combustion chamber having at least about an eighty percent (80%) mixedness.

* * * * *